Patented Aug. 25, 1925.

1,551,418

UNITED STATES PATENT OFFICE.

ALBERT W. MERRICK, OF SCOTIA, NEW YORK, ASSIGNOR TO GENERAL ELECTRIC COMPANY, A CORPORATION OF NEW YORK.

PROCESS OF MAKING HEAT-RESISTING ALLOYS.

No Drawing.  Application filed April 7, 1922.  Serial No. 550,475.

*To all whom it may concern:*

Be it known that I, ALBERT W. MERRICK, a citizen of the United States, residing at Scotia, in the county of Schenectady, State of New York, have invented certain new and useful Improvements in the Process of Making Heat-Resisting Alloys, of which the following is a specification.

My invention relates to alloys and more particularly to heat resisting alloys containing metals having widely differing melting points. In the manufacture of heat resisting alloys, particularly those containing metals which are relatively expensive it is important that the scrap metal be utilized in order to prevent the cost from becoming excessive. On the average the scrap formed in the making of a casting from an alloy of the above mentioned character is about 40% of the total metal poured without taking into account defective castings which must be scrapped. It is by no means a simple matter to utilize the scrap metal, especially in the case of an alloy containing a metal having a much lower melting point than that of the other metals with which it is to be alloyed.

One particular alloy in which the utilization of the scrap presents a serious problem is that described and claimed in an application of Gerald R. Brophy, Serial No. 478,422, filed June 17, 1921 and assigned to the same assignee as this application. This alloy contains aluminum 10%, nickel 30%, chromium 5% and iron 55%. In attempting to utilize in the usual way the scrap metal incident to the manufacture of this alloy, it was found that the aluminum almost totally disappears. If the scrap were melted in a furnace, the melting point of the iron and nickel (3000° F.) is so much higher than that of aluminum (1160° F.) that by the time the iron and nickel are melted the aluminum has been largely consumed. With an alloy containing 10% aluminum, only about 3% could be recovered. It was found that the principal cause for this destruction of the aluminum was the absence of the protecting slag on the metal. In my application, Serial No. 550,474, filed April 7, 1922, I have set forth the advantages which I have discovered of a protection of the slag on the molten aluminum. This protection is most important, if not vital, in the combining of aluminum with nickel-iron. In my present application I have taken advantage of my discovery. I have found that scrap metal containing aluminum, chromium, nickel and iron can be melted up without the loss of any of the aluminum by introducing it into the molten iron or nickel steel through the slag which covers the metal. In the case, for instance, of the alloy of aluminum, chromium, iron and nickel above mentioned, the nickel, chromium and iron are melted together in a furnace where it will be covered with slag. The scrap metal is now introduced into the molten mass by merely projecting it through the slag which closes around it and over it to protect it from oxidation. In the case of a large piece of scrap, a portion of it will be inserted in the molten metal through the slag and gradually projected further into the molten metal as the scrap melts, the slag all the time protecting the aluminum of the scrap from the air. As soon as the scrap is melted the mixture is poured onto the molten mass of aluminum in a ladle which brings the aluminum content up to the proper amount. This latter operation of introducing the aluminum into the alloy is performed in accordance with my invention covered by my application above referred to. It consists in pouring the metal from the bottom onto the aluminum so as to not to allow the slag on the molten steel to strike the slag or dross covered surface of the aluminum. I have found that by means of the above process all of the aluminum in the scrap metal is saved as is also the other metal and, knowing the percentages of metals in the scrap, a new casting of the alloy may be made having exactly the desired portions of the constituent metals.

What I claim as new and desire to secure by Letters Patent of the United States, is:—

1. The process of making an aluminum steel alloy formed in part of previously cast portions of said aluminum steel alloy which consists in melting the steel separately and then introducing the alloyed portions into the steel through the slag so that the latter closes around said portions and protects the molten metal of said portions from the air.

2. The process of making an aluminum steel alloy formed in part of previously cast portions of said alloy which consists in melting the steel separately, introducing the alloyed portions into the steel through the slag so that the latter closes around said portions and protects the molten metal of said portions from the air, and then adding sufficient aluminum to give the alloy its desired content.

3. The process of making an aluminum steel alloy formed in part of previously cast portions of said alloy which consists in melting the steel separately, providing a slag on the molten steel for protecting the molten metal from the air, introducing the alloyed portions into the molten steel through and in close contact with said slag so that the molten metal of said alloyed portions is protected from the air by the slag, and then adding sufficient aluminum to give the alloy the desired content.

In witness whereof, I have hereunto set my hand this 6th day of April, 1922.

ALBERT W. MERRICK.